Oct. 16, 1928.
J. F. FARRINGTON
1,687,933
ELECTRICAL SIGNALING SYSTEM
Filed Oct. 25, 1923
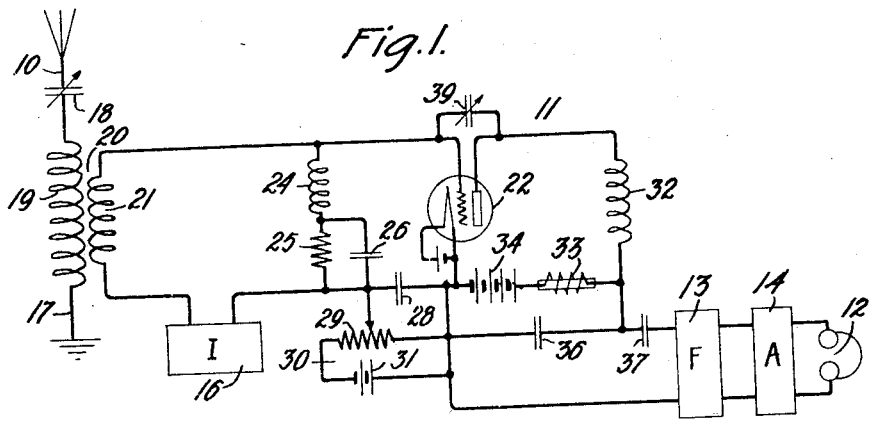
Fig. 1.
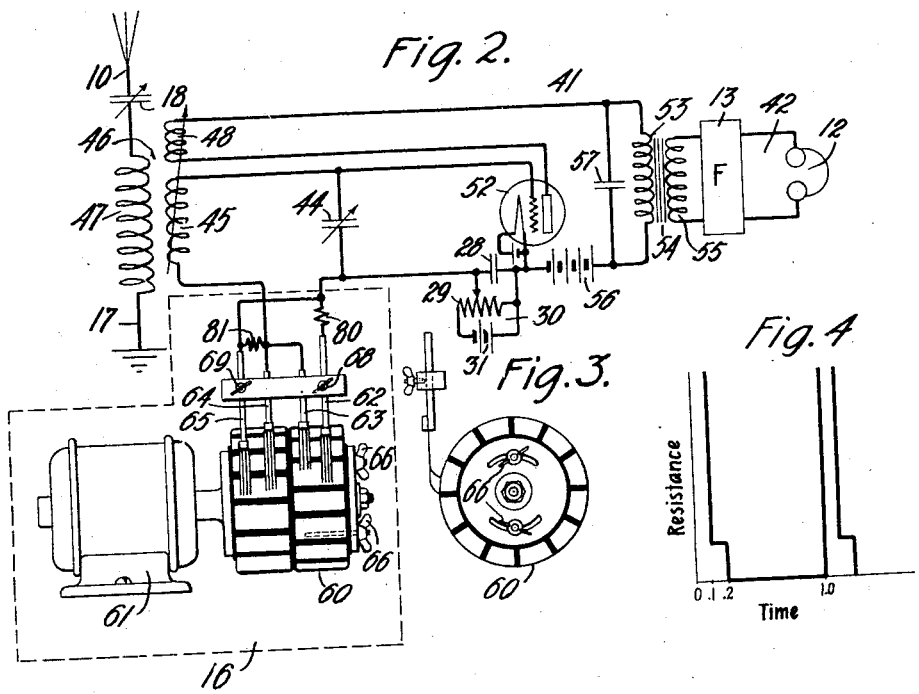
Fig. 2.
Fig. 3.
Fig. 4.
Inventor:
John F. Farrington
by E. W. Adams Att'y.

Patented Oct. 16, 1928.

1,687,933

UNITED STATES PATENT OFFICE.

JOHN F. FARRINGTON, OF FLUSHING, NEW YORK, ASSIGNOR TO WESTERN ELECTRIC COMPANY, INCORPORATED, OF NEW YORK, N. Y., A CORPORATION OF NEW YORK.

ELECTRICAL SIGNALING SYSTEM.

Application filed October 25, 1923. Serial No. 670,694.

This invention relates to electrical signaling systems.

Systems for electrical signaling have heretofore been devised in which electron discharge tubes have been utilized to augment the received signals. Arrangements wherein a local source of energy connected in the output circuit of the tube may be utilized to supply energy to an input circuit that is in energy transfer relation to the output circuit are also well known. In such circuits, if they contain capacity and inductance elements properly related, it is possible to produce sustained or undamped electrical oscillations. It has moreover, been found that these oscillations are usually initiated when the potential of the tube control electrode exceeds a certain critical value. The oscillations build up very rapidly and unless checked reach a final amplitude which bears no simple relation to the amplitude of the waves by which they were initiated. The physical result of this in systems arranged for the transmission of signals, for example, systems of telephony, is a distortion or obliteration of received signals.

It is an object of this invention to utilize the energy of free electrical oscillations for the augmentation of signal waves.

Another object is to so vary the characteristics of the oscillatory circuit as to cause the amplitude of built up oscillations to be proportional to the amplitude of the received signal waves.

A further object of the invention is to control the energy of free electrical oscillations by intermittently varying the damping of the oscillatory circuit whereby substantially distortionless reproductions of signal waves may be produced.

A still further object of the invention is to control the energy of a system capable of producing free electrical oscillations by intermittently cutting in and cutting out a resistance in said system.

Another object of the invention is to intermittently adjust a regenerative circuit to the verge of instability.

An additional object of the invention is to control the energy of free electrical oscillations in accordance with signal waves by successively and intermittently adjusting an oscillatory circuit to the verge of instability, to the condition of oscillation, and to the condition of stability.

A still further object is to modulate, in accordance with signals, wave energy derived from free electrical oscillations and to control said energy to prevent distortion of signals.

This invention may comprise a receiving circuit in which a three electrode electron discharge tube is arranged to detect received signals and to produce oscillations. This detector may have a signal receiver connected to its output circuit through a system of filters designed to pass energy of frequencies within the range of audibility and to exclude energy outside this range of frequency. If desired, an amplifier may be provided for increasing the energy supplied to the receiver. An interrupter is connected to the input circuit by means of which the resistance of this circuit may be automatically controlled.

This interrupter may comprise adjustable commutators driven by an electric motor and maintained in contact with adjustable brushes connected to the input circuit. The commutators and brushes may be arranged to bring about in succesive time order the condition on the verge of instability, the condition for oscillation and the condition of stability in the receiving circuit. By means of adjustments provided in connection with the interrupter, the time during which each condition prevails may be vaired. The frequency with which the various conditions succeed one another and recur may be varied by regulating the speed of the motor that drives the commutators.

This receiving circuit may be arranged to receive energy modulated in accordance with signals from a transmission line or from an antenna, as the case may be.

Certain embodiments of this invention are illustrated in the drawings, namely:

Fig. 1, a regenerative radio receiving circuit utilizing the interrupter of this invention for controlling the condition of the circuit.

Fig. 2, a regenerative circuit of the feed back type arranged in accordance with this invention.

Fig. 3 is an end view of the commutator of the interrupter shown connected in the circuit of Fig. 2.

Fig. 4, a curve showing the manner in which the resistance of the oscillatory circuit in Figs. 1 and 2 is varied with respect to time by the interrupter.

The signal system in Fig. 1 comprises an antenna 10 coupled to a vacuum tube oscillator circuit indicated generally by 11 arranged to supply energy to a receiver 12 connected thereto through filter 13 and amplifier 14. The oscillator is controlled by a device represented by block 16, that is illustrated in detail in Fig. 2. The antenna 10 connects to ground at 17 through a series circuit including the variable tuning condenser 18 and one winding 19 of the transformer 20. Transformer 20 has a secondary winding 21 included in the input circuit of a vacuum tube 22 which input circuit is connected to the filament and grid of the tube. The device 16 is connected in series with the winding 21 of transformer 20 and these in turn are shunted by the inductance 24 in series with the resistance 25, itself shunted by a condenser 26. The condenser 28 is also connected in series to the input circuit. Around this condenser is connected a potentiometer comprising adjustable resistance 29 in series with battery 31.

The output circuit of tube 22 which is connected across the filament and plate includes an inductance 32, a choke coil 33 and plate battery 34. A condenser 36 is shunted about choke coil 33 and battery 34. A receiving circuit including a series condenser 37, filter 13 and amplifier 14 and receiver 12 is connected to the terminals of condenser 36. Across the plate and grid of tube 22 is connected a variable condenser 39.

The vacuum tube oscillator 11 comprises an adjustable resonant circuit formed by inductances 21 and 32 in series with variable condenser 39 in which electrical oscillations may be established in the manner described in Patent No. 1,356,763 to R. V. L. Hartley, patented October 26, 1920. The block 16 represents an interrupter such as is shown within the dotted square in Fig. 2 arranged to control the resistance of the oscillatory circuit. The inductance 24, resistance 25, and potentiometer 30 are connected in the circuit for the purpose of supplying the proper negative potential to the grid of tube 22. These elements are preferably of such values as to offer very high impedance to high frequency currents. The condensers 26, 28 and 36 are provided to supply a low impedance path for high frequency currents. Condenser 37 is designed to pass frequencies within the range used for signaling. The choke coil 33 is designed to prevent alternating current from passing through battery 34.

In the operation of this system electrical energy modulated in accordance with signals is received by antenna 10 for which, if desired, may be substituted a transmission line. The antenna circuit may be tuned by means of variable condenser 18 to the wave length of energy which it is desired to receive. Energy variations in the antenna circuit are transmitted to the detector input circuit through the medium of transformer 20 which has, as described, a winding 21 connected in this input circuit in series with the interrupter represented by block 16. The device 16 is arranged to periodically and successively produce a short circuit across its terminals, to connect a large damping resistance to its terminals, and to connect a relatively small damping resistance across its terminals. These three connections may take place at a very high frequency, for example, at frequencies above the limits of audibility or they may take place at audible frequencies.

The various elements of the oscillator 11 are preferably adjusted to such values that when the terminals of block 16 are short circuited electrical oscillation will be initiated by the action of energy transmitted to the circuit from antenna 10. It is one purpose of this invention to utilize the energy of these oscillations in their transient state for the purpose of producing amplifications of the received signals, that is, to produce what has been termed superregeneration.

During the time that the larger damping resistance is connected across the terminals of device 16, the oscillations built up in the circuit are damped. Subsequent to the damping out of the oscillation a resistance is connected across the terminal of block 16 which resistance is preferably of value such that the oscillator 11 is on the verge of instability, in other words, about to oscillate. By so adjusting the circuit prior to short circuiting the terminals it is made capable of instantaneous response to the energy from antenna 10 when short circuiting occurs. This insures that the energy of built up oscillations will be proportional to the amplitude of received waves and consequently no distortion of signals takes place.

In Fig. 2 an antenna 10 connected to a series circuit similar to that of Fig. 1 is coupled to a vacuum tube oscillator 41 of the feed back type. This oscillator has the resistance of its resonant circuit controlled by the device 16 and supplies energy to a signal receiving circuit 42 comprising a telephone receiver 12 and a wave filter 13.

The oscillator 41 comprises a vacuum tube 52 having an input circuit and an output circuit. A tuned circuit consisting of a variable condenser 44 connected to one winding 45 of the transformer 46 having a second winding 47 connected in the antenna circuit is connected in the input circuit of tube 52. A third variable winding 48 of this transformer is connected to the output circuit of tube 52 in series with a winding 53 of an iron core transformer 54 and a plate battery 56. The winding 53 is shunted by a condenser 57 designed to offer low impedance to high frequency currents, for example, those outside the audible range. The potentiometer 30 is arranged to produce a normal biasing potential on the grid of tube 52. The condenser 28 is connected between the terminals of this potentiometer to permit the passage of high frequency current. The device 16 is connected in the resonant circuit between transformer winding 45 and condenser 44.

The device 16 comprises a two section commutator 60 driven by motor 61 and arranged to make contact with brushes 62, 63, 64 and 65 respectively. The two sections of commutator 60 are insulated from each other and may be adjusted as to relative angular position and held in place by means of nuts 66. Brushes 62 and 65 are adjustable by means of nuts 68 and 69 respectively. Brush 62 is electrically connected to one terminal of the resistance 80, the opposite terminal of this resistance being connected to brush 65 and also to the terminal of condenser 44 in the resonant circuit. Brushes 63 and 64 are connected together and also connected to one terminal of a second resistance 81 and to a terminal of transformer winding 45. The opposite terminal of resistance 81 connects to brush 65. By adjusting brush 62, the relative time during which the oscillator 41 is adjusted to a condition on the verge of instability may be determined. Adjustment of brush 65 on the other hand determines the relative time during which the oscillator 41 is in an unstable or oscillatory condition. By adjusting the two sections of the commutator 60 with respect to their angular positions the various connections of the resistance 80 and 81 of the resonant circuit may be caused to occur in their proper sequence. Also by adjustment of the brushes 62 and 65 and by the adjustment of commutator 60 the duration of the period in which damping of the oscillations in the resonant circuit 44—45 occurs may be determined.

In Fig. 3, an end view of the commutator and brushes of the device 16 is shown.

When electric wave energy is received by antenna 10, variations corresponding to the variation of this energy are transmitted to the input circuit of the oscillator 41 through the medium of transformer 46. These variations produce changes in the potential of the grid of tube 52 which results in the well known manner in corresponding variations of current in the circuit connected between the plate and filament of this tube. The plate circuit in this instance includes adjustable winding 48 of transformer 46, whereby energy from the battery 56 in the output circuit of tube 52 is supplied to the input circuit thereof. By virtue of this supply of energy the oscillator 41 is caused, when its various elements are properly adjusted, to build up oscillations. By means of device 16, however, the rate and time of building up and decay of these oscillations is controlled. The energy of the free oscillations generated in circuit 41 is utilized for the augmentation of signals received by antenna 10. It has been found that the free oscilliations, initiated by the energy of the received waves, build up in amplitude proportional to the amplitude of the received waves. However, should these oscillations be allowed to reach their maximum amplitude, the proportionality between their amplitude and the amplitude of received signals would thereupon be destroyed. By periodically damping the free oscillations in the tuned circuits 44 and 45, the amplitude of free oscillations is maintained substantially proportional to the amplitude of received waves.

In the device 16 when brushes 62 and 63 are in contact with the same commutator segment resistances 80 and 81 are connected in parallel to each other in the resonant circuit 44—45. The value of their combined resistance is preferably such as to adjust the oscillator 41 to the verge of instability.

When brushes 62 and 63 are upon different commutator segments, resistance 80 is disconnected from the circuit. If at the same time brushes 64 and 65 are in contact with the same commutator segment, resistance 81 is short circuited and the oscillator 41 is adjusted to an oscillatory condition. But when all four brushes are simultaneously in contact with separate commutator segments, resistance 81 is connected in the resonant circuit. This resistance may be of any value sufficient to adjust the oscillator circuit to a condition such that oscillations are dampened out. Now by the rotation of the commutator 60 these various conditions in the oscillator circuit recur in succession in the order described. The result is that greatly amplified currents having variations corresponding to the variations of the received waves, occur in the oscillator circuit. As the vacuum tube 52 is also adjusted to function as a detector these amplified high frequency waves are detected and there results in the output circuit signal waves having the characteristics of the signal modulations of carrier waves received by the antenna 10. These waves also have amplitude variations introduced by the interrupter 16. The signal waves are transmitted by transformer 54 from the output circuit of tube 52 to the receiver circuit 42. Condenser 57 is designed to provide a path about the transformer winding 52, for currents of frequencies above the signal frequency range. Filter 13 is further designed to prevent the transmission of current other than those of the signal frequencies to the receiver 12.

The manner of variation of the resistance in the resonant circuits of Figs. 1 and 2 by device 16 is illustrated by the curves of Fig. 4. The ordinates represent values of resistance and the abscissæ represent time. Abscissa 0-.1 is proportional to the time resistance 81 is cut into the resonant circuit. It thus represents the time of damping out of oscillations. Distance .1-.2 is proportional to the time resistances 80 and 81 are included in parallel in the resonant circuit and thus represents the time during which the oscillator is adjusted to the verge of instability and is susceptible to control by the received waves. Distance .2-1.0 represents the remainder of the time of the interrupter cycle during which the terminals of device 16 are short circuited and during which free oscillations build up in the resonant circuit. By adjustment of the brushes of interrupter 16 the relative lengths of time allotted to the various stages may be varied at will and by varying the speed of motor 61 the absolute time allotted to each condition may also be varied to adjust the system to obtain best results.

Although this receiving circuit has been described as receiving energy from an antenna, it will be readily understood that it is equally applicable to reception of signals transmitted over wires. The embodiments of this invention which have been described are intended to illustrate the principles involved and are not representative of the limits of their application.

What is claimed is.

1. In a signal receiving system, an electric discharge device, circuit connections therefor, for rendering said device capable of building up oscillations, means for impressing received signal waves on said device, a substantially non-inductive resistance element, and a mechanical interrupter for controlling the connection of said resistance in the circuit of said device whereby the amplitude of the built up oscillations is controlled in accordance with said received signal waves.

2. The combination in a radiant energy signaling system of a vacuum tube detector having an input circuit and an output circuit, an antenna coupled with said input circuit a signal receiver connected to said output circuit, means for supplying energy from said output circuit to said input circuit and a plurality of non-inductive resistances adapted to be connected in said input circuit in a plurality of ways to periodically establish free electrical oscillations.

3. A system for electrical energy translation which comprises a vacuum tube detector having an output circuit in feed back relation to an input circuit, means for impressing signal waves upon said input circuit, and additional means comprising an adjustable commutator in contact with adjustable brushes for successively connecting a plurality of resistances in said input circuit to successively establish the oscillatory condition, the condition of stability and the condition on the verge of instability, whereby free electrical oscillations proportional to the amplitude of received waves may be periodically established in said circuits.

4. An electrical system which comprises a regenerative feed back system, means for adjusting the constants of the system to produce periodically and successively the conditions of stability, on the verge of instability and instability, said means comprising an interrupter capable of being adjusted to vary the relative duration of each of said conditions.

5. In a signaling system, an electric discharge device having an input circuit and an output circuit, means for coupling together said circuits for transferring energy from one to the other, means for supplying waves to be amplified to said input circuit, a plurality of non-inductive resistance elements adapted to be connected in said circuit in a plurality of ways to periodically establish free electrical oscillations.

In witness whereof, I hereunto subscribe my name this 15th day of October, 1923.

JOHN F. FARRINGTON.